March 30, 1965     H. K. WILSON     3,175,262
CLAMP
Filed April 2, 1962
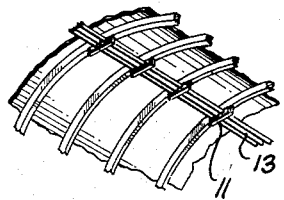
FIG. 1.
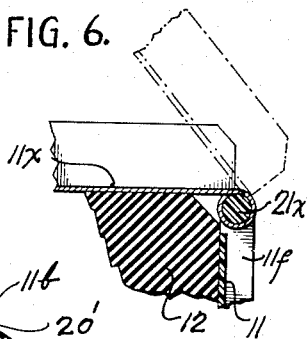
FIG. 6.
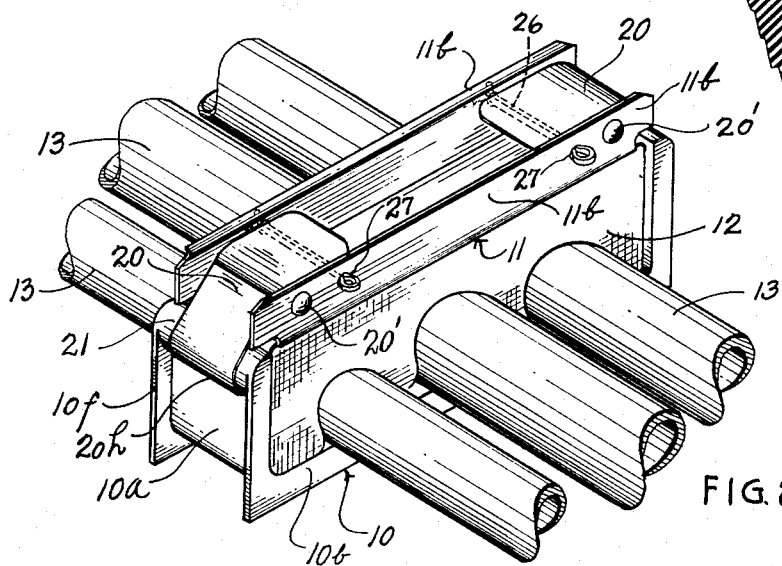
FIG. 2.
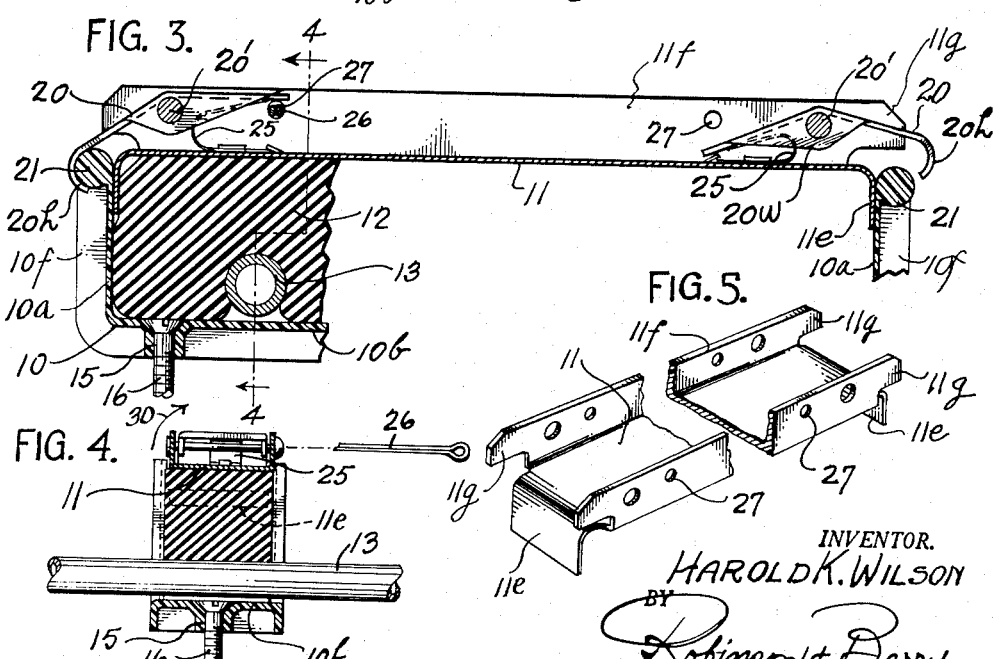
INVENTOR.
HAROLD K. WILSON
BY
Robinson & Berry
ATTORNEYS

United States Patent Office 3,175,262
Patented Mar. 30, 1965

3,175,262
CLAMP
Harold K. Wilson, 8603 231st St. SW.,
Edmonds, Wash.
Filed Apr. 2, 1962, Ser. No. 184,017
4 Claims. (Cl. 24—16)

This invention relates to what will herein be designated "a quickly releasable holding clamp" for wires, cables, rods and the like. More particularly, it pertains to the provision of an improved form of clamp that is especially useful for supporting therein the electric lines, cables or similarly applicable members from, as for example, the ribs or frame structure embodying the fuselage of an airplane. However, it is to be understood that there are various similar applications and uses for this clamp and it is not the intent that it be restricted or confined to anyone or more of its possible uses.

It is the primary object of this invention to provide a clamp wherein a mounting yoke, a clamp bar and a cushioning pad are assembled in a novel manner for the safe, and secure holding of electric cables, wires, pipelines, rods and the like, and which provides for easy and ready release of the clamp bar for the removal of the supported cables or wires from the yoke, or for their replacement when such is required or desired.

Yet another object of the invention is to provide the yoke forming member of the clamp with features of construction that provide for its fixed attachment to a support readily and effectively accomplished; wherein the clamp bar is designed to span the open side of the yoke member and to holdingly and securely engage with the yoke arms, for the securement of the supported cables, wires or rods in the yoke, yet may be easily manually released therefrom by actuation of special latching means with which the cross-bar is equipped and which latches are features in this application.

Still further object of the invention reside in the details of construction of the latches and latch engaging means of the yoke arms and in the use of a compressible pad between latch bar and yoke base that is beneficial for improving the clamps holding efficiency.

Another object of the invention is to provide the latch bar with means whereby the latching hooks may be held against any accidental disengagement from their holding connections with the yoke arms.

In accomplishing the above mentioned and other objects of the invention hereinafter disclosed, I have provided the improved details of construction, the preferred forms of which are illustrated in the accompanying drawings, wherein:

FIG. 1 is a fragmental view of a portion of the arched ribbing of an airplane fuselage, showing cables supported therefrom by clamping means embodied by the present invention.

FIG. 2 is a perspective view showing a cable securing clamp of the present invention in its functional use.

FIG. 3 is a side view of a portion of the clamp as shown in FIG. 2 with one end of its cross-bar latched and the other end latch in its bar releasing position.

FIG. 4 is a cross-section taken on line 4—4 in FIG. 3.

FIG. 5 is a perspective view of the cross-bar with its end latching means removed therefrom for better understanding of bar details.

FIG. 6 is a sectional detail of an alternative construction wherein the clamp bar is pivotally secured against release at one end.

Referring more in detail to the drawings:

The present clamp is best shown in FIG. 2 to comprise the yoke 10, the clamp bar 11 and cable or line retaining cushioning pad or block 12 in their normal functional relationship. The clamp is shown in FIG. 2 to be supporting three cables, rods, bars or bundles of wires each designated by numeral 13.

The yoke comprises a rather elongated U-shaped member which, as best shown in FIGS. 2 and 3, comprises the horizontal base portion 10b, with upwardly directed arms 10a—10a of equal extent, at its opposite ends. It is to be understood from the FIG. 3 illustration that the base 10b and its two opposite end arms 10a—10a are integrally formed and have substantial rigidity by reason of the formation thereon of opposite edge flanges 10f that extend along the base of the yoke and then up along the opposite side edges of the arms.

The horizontal base member of the yoke is shown in FIGS. 3 and 4 to be formed with holes 15 therethrough for the passage of yoke securing screws or bolts 16. In its present formation, this yoke is molded of a selected plastic material. Its transverse width is approximately one inch, its width between the arms is approximately four inches and the vertical height of its arms is approximately one and one-fourth inch. However, these dimensions are not critical and may be changed to suit the particular use to which the clamp is to be put, and it might be cast or molded or any other suitable material.

The clamp bar 11 is die formed from suitable sheet material, preferably a rigid metal of light weight, such as aluminum. Its length is such that it will span the distance between the upper ends of the yoke arms as shown in FIG. 2 wherein it is to be observed that the clamp bar 11 is formed with downturned opposite end portions 11e—11e that flatly engage against the inside faces of the upper end portions of the arms. The clamp bar also is formed along its opposite longitudinal edges with upturned flanges 11f which project beyond the downturned end portions 11e—11e to engage with the upper ends of the arms as a means for limiting the downward movement of the clamp bar into the yoke.

It has been well shown in FIGS. 2 and 3 that clamp bar 11 is equipped at its opposite ends and between the upturned flanges 11f—11f with latches 20—20 that are pivotally mounted by pivots 20' for releasable holding engagement with the upper end portions of the yoke arms. It is to be observed also by reference to FIGS. 2 and 3 that each of the yoke arms terminates at its top end with an outwardly formed horizontally extending cylindrically shaped bead 21 with which the corresponding latch member 20 may be holdingly engaged as shown at the left end of FIG. 3.

Each latch member is formed from a sheet metal plate bent medially of its ends to a wide angle formation and which plate is curved at its outer end to a hook-shaped bead engaging portion 20h and is formed at opposite side edges with downturned wings 20w through which the pivot pin 20' is extended for the pivotal mounting of the latch between the opposite edge flanges 11f—11f of the clamp bar. Also, associated with each latch is a leaf spring 25 that is positioned between the bar and inner end portion of the latch member to urge the outer end hook 20h of the latch to holding position. It has also been indicated in FIGS. 1 and 3 that a pin or cotter key 26 may be projected through holes 27 in the flanges of the cross-bar immediately below the inner end portion of the latch when in holding position, to prevent any accidental release from that position.

Assuming that the parts of the clamp are formed, mounted and associated as described, use of the clamps would anticipate that the yoke portions 10 first be placed and secured in position as, for example, on the frame ribbing of an airplane fuselage as indicated in FIG. 1. Then the cables, rods or wires to be supported thereby are lifted into the yokes and the clamp bars applied to the yokes. It is preferred also that as the yokes are secured, a block or filters of sponge rubber or the like be fitted therein to seat the cables 13 and which may if desired be transversely recessed as shown to receive the cables therein. These blocks are of such dimensions as to be readily applicable to the yoke and when in place will be held under compression by the clamp bars and the contained cables in their clamping positions, as herein shown.

It is a further feature of the present clamp that the expanding pressure of the rubber blocks 12 against the clamp bars operate to cause the hooked ends 20h of the latches 20 to more securely grip the end beads 21 of the yoke arms. However, when manual pressure is applied downwardly against the inner end portions of the latches 20 their hook ends will be readily disengaged from holding contact with the beads 21 on the yoke arms and as the latch depressing pressure is released, the expanding force of the compressed sponge rubber block 12 will lift the latch ends of the clamp bar to released positions.

It is also a feature of the present clamp that the downturned end portions 11e of the clamp bar 12 will retain the bar against any endwise movement relative to the yoke arms after they have been applied between the yoke arms as in FIG. 2, and the extended end portions 11g of the opposite side flanges of the cross-bar will engage the top ends of the yoke arms to prevent the cross-bar being accidentally disengaged from the yoke by any upward pull of a cable or other force that would cause an upward tilting of either opposite edge of the bar in the direction of the arcuate arrow 30 in FIG. 4.

As an alternative construction, it has been shown in FIG. 6 that a clamp bar 11x may be permanently pivotally secured at one end while releasable at its other end. This view shows the upper end of the yoke arm to terminate in a hinge pin formation 21x with the end of the clamp bar curved therearound. The opposite end of this clamp bar would be as in FIG. 3.

What I claim as new is:

1. A cable clamp of the character described comprising a unitary base bar, said base bar including a flat, elongated base portion and upwardly directed arms at opposite ends of said base portion thereby providing a confined seat between them for reception and securement of a plurality of cables of random size and variable in number, the upper ends of said arms terminating in outwardly extending heads; an imperforate rectangular block of resilient material positioned between and abutting said arms and overlying and in engagement with said cables on said base portion; an elongated clamp bar substantially coextensive with said base bar, means on opposite ends of said clamp bar to engage said heads and limit the downward movement thereof and releasable latching means on at least one end of said clamp bar engageable with a head for releasably securing the clamp bar to said base bar.

2. A cable clamp as in claim 1 including means on said clamp bar engageable with said latching means to prevent the unintentional release of said latching means.

3. A cable clamp as in claim 1 wherein said latch means comprises a latching hook pivotably mounted on said clamp bar intermediate the ends of the hook and spring means operable to urge said latching hook into latching engagement with said head.

4. A cable clamp as in claim 1 wherein latching means is provided on opposite ends of said clamp bar.

References Cited by the Examiner
UNITED STATES PATENTS

| | | | |
|---|---|---|---|
| 274,497 | 3/83 | Judson | 292—128 |
| 1,429,751 | 9/22 | Mazzullo. | |
| 1,834,404 | 12/31 | Koch | 248—68 |
| 2,251,138 | 7/41 | Knight | 292—128 |
| 2,417,260 | 3/47 | Morehouse | 248—68 X |
| 2,650,948 | 9/53 | Findlay | 248—68 X |
| 2,775,806 | 1/57 | Love | 24—271 |

FOREIGN PATENTS

| | | |
|---|---|---|
| 1,194,750 | 5/59 | France. |
| 703,447 | 3/41 | Germany. |
| 407,426 | 3/34 | Great Britain. |

DONLEY J. STOCKING, *Primary Examiner.*

ABRAHAM G. STONE, *Examiner.*